US008421913B2

(12) United States Patent
Kim et al.

(10) Patent No.: US 8,421,913 B2
(45) Date of Patent: Apr. 16, 2013

(54) MOBILE TERMINAL

(75) Inventors: Chang Jae Kim, Seoul (KR); Kyoung Yong Kim, Seoul (KR); Tae Wha Choi, Gunpo-si (KR); Seung Geun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 12/874,701

(22) Filed: Sep. 2, 2010

(65) Prior Publication Data

US 2011/0050989 A1 Mar. 3, 2011

(30) Foreign Application Priority Data

Sep. 2, 2009 (KR) .................. 10-2009-0082504

(51) Int. Cl.
*H04N 5/225* (2006.01)
(52) U.S. Cl.
USPC .......................................... 348/376; 348/373
(58) Field of Classification Search ........... 348/373–376
See application file for complete search history.

(56) References Cited

U.S. PATENT DOCUMENTS

| 7,495,702 | B2 * | 2/2009 | Herranen et al. | 348/373 |
| 7,636,124 | B2 * | 12/2009 | Yoo et al. | 348/373 |
| 7,719,609 | B2 * | 5/2010 | Oda et al. | 348/373 |
| 2005/0026331 | A1 * | 2/2005 | Chiu | 438/121 |
| 2005/0219398 | A1 * | 10/2005 | Sato et al. | 348/340 |
| 2006/0202793 | A1 * | 9/2006 | Akahoshi | 338/34 |
| 2008/0174692 | A1 * | 7/2008 | Kusaki et al. | 348/374 |
| 2008/0205873 | A1 * | 8/2008 | Park | 396/200 |
| 2009/0040360 | A1 * | 2/2009 | Taniguchi | 348/335 |
| 2009/0109330 | A1 * | 4/2009 | Nakano et al. | 348/374 |

* cited by examiner

*Primary Examiner* — Tuan Ho
*Assistant Examiner* — Shahbaz Nazrul
(74) *Attorney, Agent, or Firm* — Birch, Stewart, Kolasch & Birch, LLP

(57) ABSTRACT

A mobile terminal is disclosed, by which a user is facilitated to carry and use a terminal in a simple and easy way. According to the present invention, since a camera module is configured in a manner that a protective cover is provided not to a case but to a module body, it is advantageous in protecting a lens unit provided to the module body before installing the camera module at the case. While light passes through a protective cover, a protective cover physically isolates an inside of a camera module from an outside to prevent external particles from being introduced into the camera module. Therefore, it is advantageous in enhancing durability of the camera module. A loading portion is provided to a case to guide an installation position of a camera module. A separate cover is not added to the case. And, a protective cover of a camera module is directly exposed to outside. Therefore, accumulation of numerical value tolerance is barely generated and an assembly process is simplified.

16 Claims, 8 Drawing Sheets

MOBILE TERMINAL

Pursuant to 35 U.S.C. §119(a), this application claims the benefit of earlier filing date and right of priority to Korean Application No. 10-2009-0082504, filed on Sep. 2, 2009, the contents of which are hereby incorporated by reference herein in their entirety.

BACKGROUND OF THE INVENTION

1. Field of the Invention

The present invention relates to a mobile terminal. Although the present invention is suitable for a wide scope of applications, it is particularly suitable for facilitating a user to carry and use a terminal in a simple and easy way.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Moreover, a mobile terminal is accepted as a personal thing for representing user's individuality and the demand for various terminal designs is ongoing to rise.

The recent technical development brings about digital convergence for enabling various kinds of technologies or performances to merge into one. And, the digital convergence enables a mobile terminal to be equipped with a camera module capable of taking pictures.

The camera module normally has a lens for light transmission. And, the lens of the camera module is externally exposed as it is. Moreover, a case of the mobile terminal is provided with a plastic or glass cover (hereinafter called a transparent cover) configured to enable light to be incident on the lens of the camera module. In this case, the plastic or glass cover is provided to oppose an installed position of the camera module.

Thus, if a transparent cover for protecting a lens of a camera module is attached not to the camera module but to a case of a mobile terminal, a prescribed gap lies between the transparent cover and the lens of the camera module. And, some particles can be introduced into the camera module to cause damage to internal parts of the camera module.

Before a camera module is installed at a mobile terminal, it is transferred and installed as an individual part. This, in a camera module manufacturing and installing process, damage may be caused to a lens of the camera module directly exposed to an external environment.

In order for a camera module to be installed to oppose a transparent cover of a mobile terminal, a pad for dust and particle prevention is inserted between the transparent cover and the camera module. If such a separate part as a pad and the like is additionally provided, a manufacturing process gets complicated and a product cost is raised. Moreover, it becomes difficult to accurately install a camera module due to accumulation of numerical value tolerance and the like.

SUMMARY OF THE INVENTION

Accordingly, the present invention is directed to a mobile terminal that substantially obviates one or more problems due to limitations and disadvantages of the related art.

An object of the present invention is to provide a mobile terminal, by which a lens off a camera module can be protected using a self-structure of the camera module.

Another object of the present invention is to provide a mobile terminal, by which introduction of external particles can be prevented in a manner of isolating an inner space of a camera module from an outer space.

A further object of the present invention is to provide a mobile terminal, by which a camera module and a case is directly assembled together without attaching a separate configuration therebetween.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a case forming an exterior of a body, the case provided with a penetrating hole, a module body provided within the case, the module body having at least one lens provided to oppose an incident hole open toward the penetrating hole, the module body having an image sensor forming an optical image of a subject delivered via the incident hole to convert the optical image to an electric signal, and a protective cover assembled to one face of the module body corresponding to the incident hole, the protective cover formed of a transparent material through which light passes, the protective cover exposed outside the case via the penetrating hole of the case.

Preferably, an adhesive agent is coated between the protective cover and the module body to isolate an inside of the module body from an outside.

More preferably, the one face of the module body provided with the incident hole is supported by an inner surface of the case.

In this case, a loading portion recessed along an edge of the penetrating hole is provided to the case and the one face of the module body is configured to adhere closely to the loading portion. Moreover, the penetrating hole is configured to correspond to the protective cover and an outer surface of the protective cover and an outer surface of the case are located in a same plane. Besides, a height of the protective cover projected from the one surface of the module body is equal to a thickness of the case provided with the loading portion.

In this case, an inner circumference of the case provided with the penetrating hole is configured to adhere closely to an outer circumference of the protective cover. Moreover, an outer diameter of the protective cover is set greater than an inner diameter of the penetrating hole and the protective cover is forcibly fitted into the penetrating hole by shrink-fit.

Besides, the protective cover is formed of tempered glass formed by thermal treatment to bear external shock or abrupt temperature change.

In this case, a ring-type sealing member is provided to an inner circumference of the case provided with the penetrating hole to enclose and support an outer circumference of the protective cover. Moreover, the sealing member is formed of an elastically transformable material to be compressibly attached to the outer circumference of the protective cover.

In this case, a guide portion configured to incline toward an assembled direction of the protective cover is provided to an inner circumference of the case provided with the penetrating hole along an edge of the penetrating hole. Moreover, a loading portion recessed along the edge of the penetrating hole is provided to the inner surface of the case to correspond to the module body and the one face of the module body provided with the incident hole is configured to adhere closely to the loading portion. Besides, the guide portion is configured to incline along the edge of the penetrating hole between the inner circumference of the case provided with the penetrating hole and the loading portion.

In another aspect of the present invention, a mobile terminal includes a case forming an exterior of a body, the case provided with a penetrating hole and a camera module provided within the case. And, the camera module includes at least one lens provided to oppose the penetrating hole, an image sensor forming an optical image of a subject delivered via the at least one lens to convert the optical image to an electric signal, and a protective cover inserted in the penetrating hole to protect the at least one lens.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
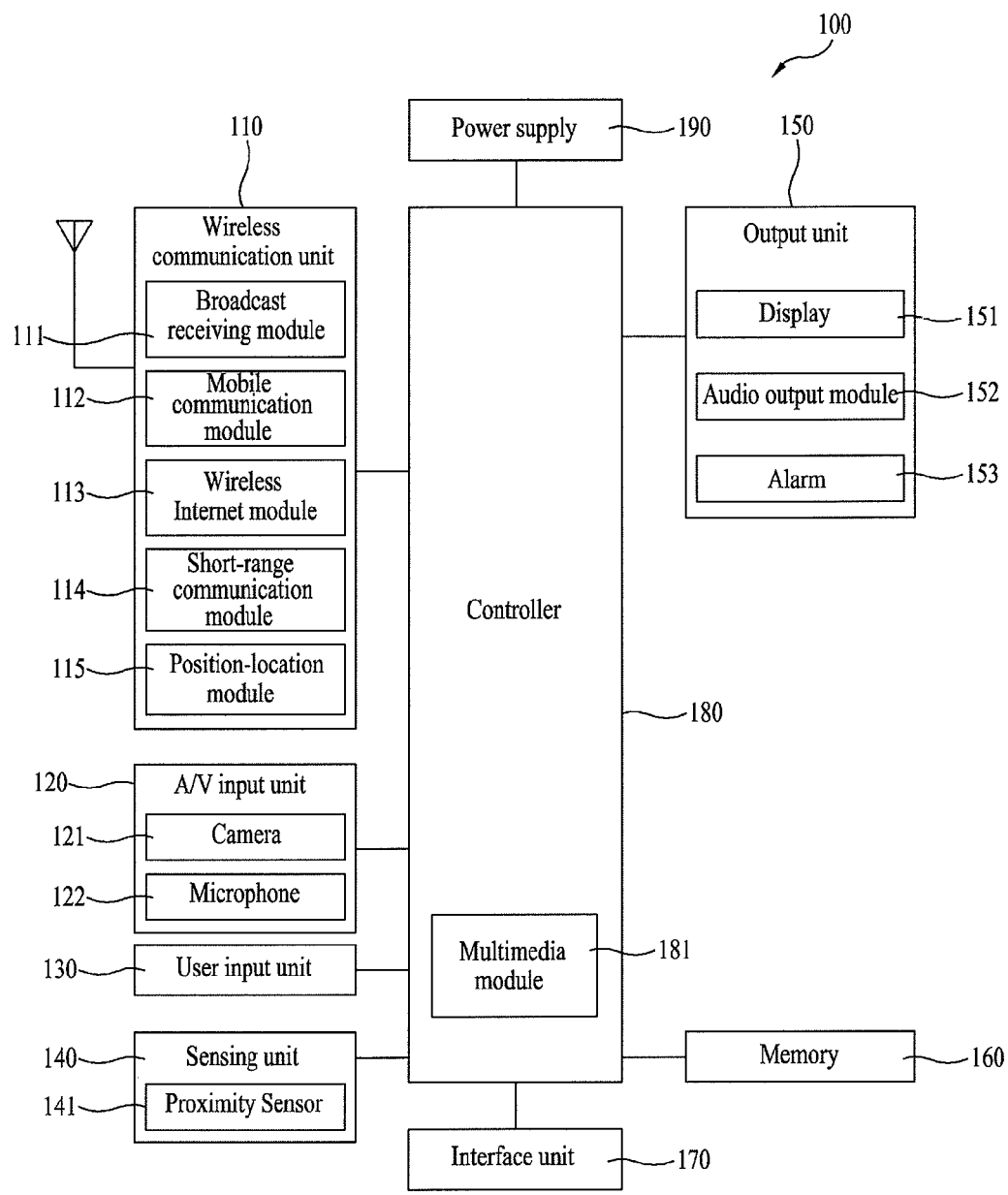
FIG. 1 is a block diagram of a mobile terminal in accordance with an embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 in pursuit of simultaneous receptions of at least two broadcast channels or broadcast channel switching facilitation.

Examples of broadcast associated information include information associated with a broadcast channel, a broadcast program, a broadcast service provider, etc. For example, the broadcast associated information may include an electronic program guide (EPG) of digital multimedia broadcasting (DMB) and an electronic service guide (ESG) of digital video broadcast-handheld (DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN) (Wi-Fi), Wibro (Wireless broadband), Wimax (World Interoperability for Microwave Access), and HSDPA (High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

An audio/video (A/V) input unit 120 is configured to provide audio or video signal input to the mobile terminal 100.

As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays can be configured transparent so that an external environment can be seen through the corresponding display. Such a display can be called a transparent display. As a representative example for the transparent display, there is a transparent LCD display or the like.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touchscreen can be configured to detect a touch input pressure as well as a touch input position and size.

Meanwhile, a proximity sensor 141 can be provided within or around the touchscreen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

Example for an operational principle of the proximity sensor is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, a proximity switch is able to detect the object to detect without interference with the material.

In spite of not providing the proximity sensor, if the touchscreen is electrostatic, it can be configured to detect the proximity of a pointer through an electric field change attributed to the proximity of the pointer.

So, in case that the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. And, a position, at which the proximity touch is made to the touchscreen using the pointer, means a position of the pointer vertically corresponding to the touchscreen when the pointer makes the proximity touch.

If the proximity sensor is used, it is able to sense a proximity touch and its pattern (e.g., proximity touch distance, proximity touch direction, proximity touch speed, proximity touch position, proximity touch moving state, etc.). And, it is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, data for various patterns of vibration and/or sound outputted in case of a touch input to the touchscreen can be stored in the memory 160.

As map information can be stored in the memory 160, user's convenience can be further provided in a manner of providing the map information to a user if necessary. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
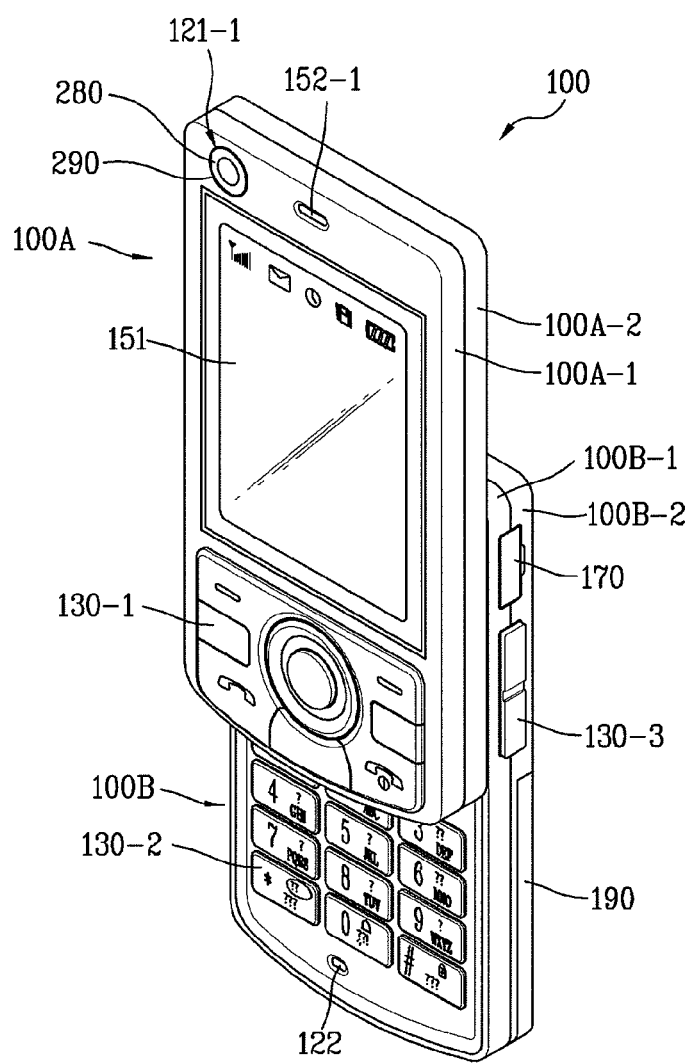
FIG. 2 is a perspective diagram for a front configuration of a mobile terminal according to an embodiment of the present invention.

FIG. 2 is a perspective diagram for a front configuration of a mobile terminal according to an embodiment of the present invention.

Referring to FIG. 2, a mobile terminal according to the present invention includes a first body 100A and a second body 100B configured slidable on the first body 100A along at least one direction.

If the first body 100A is arranged in a manner of being superposed on the second body 100B, it can be named a closed configuration. If the first body 100A is configured to expose at least one portion of the second body 100B, it can be named an open configuration.

In the closed configuration, the mobile terminal is mainly operable in a standby mode. And, the standby mode can be released by user's manipulation. In the open configuration, the mobile terminal is mainly operable in a call mode or the like. According to user's manipulation or expiration of prescribed time, a mode of the mobile terminal can be switched to the standby mode.

A case (e.g., casing, housing, cover, etc.) forming an exterior of the first body 100A includes a first front case 100A-1 and a first rear case 100A-2. Various electric and electronic parts are loaded in a space provided by the first front case 100A-1 and the first rear case 100A-2. And, at least one or more middle cases can be additionally provided between the first front case 100A-1 and the first rear case 100A-2.

In this case, the cases can be formed by injection modeling of synthetic resin. Alternatively, the cases can be formed of metal material such as stainless steel (STS), titanium (Ti) and the like.

A display module 151, a first audio output module 152-1, a first camera module and a first manipulating unit 130-1 can be provided to the first body 100A, and more particularly, to the first front case 100A-1.

The display module 151 includes at least one of devices for representing information visually. In this case, the display module 151 includes a liquid crystal display (LCD), an organic light emitting diode (OLED) display and/or the like.

A touchpad is superposed onto the display module 151 to configure a layered structure. Therefore, the display module 151 can operate as a touchscreen to enable information to be inputted by a touch made by a user.

The first audio output module 152-1 can be implemented as a receiver or a speaker.

The first camera module 121-1 can be implemented suitable for photographing an image or moving picture of a ser and the like.

The first manipulating unit 130-1 receives an input of a command for controlling an operation off the mobile terminal.

Like the first body 100A, a case forming an exterior of the second body 100B includes a second front case 100B-1 and a second rear case 100B-2.

A second manipulating unit 130-2 can be provided to the second body 100B, and more particularly, to a front face of the second front case 100B-1.

And, a third manipulating unit 130-3, a microphone module 122 and an interface unit 170 can be provided to at least one of the second front case 100B-1 and the second rear case 100B-2.

The first to third manipulating units 130-1, 130-2 and 130-3 can be generally called a manipulating portion 130. And, the manipulating portion can adopt any tactile manner that enables a user to perform manipulation with tactile feeling.

For instance, it is able to implement the manipulating portion with a dome switch or a touchpad, which can receive a command or information by user's push or touch manipulation. Alternatively, the manipulating portion can be implemented by such a manipulating system as a key rotating wheel, a jog, a joystick and the like.

In aspect of functionality, the first manipulating unit 130-1 is provided to input such a command as start, end, scroll and the like. And, the second manipulating unit 1302-2 is provided to input numerals, characters, symbols and the like.

Moreover, the third manipulating unit 130-3 can work as a hot-key for activating a special function within the mobile terminal.

The microphone module 122 can be implemented into a form suitable for receiving an input of user's speech and other sounds.

The interface unit 170 becomes a passage for enabling the mobile terminal of the present invention to perform data exchange with an external device and the like. For instance, the interface unit 170 can include at least one of a connection terminal for connection to an earphone by wire or wireless, a port for short range communication (e.g., IrDA port, Bluetooth port, wireless LAN port, etc.) and power supply terminals for supplying power to the mobile terminal.

The interface unit 170 can include a card socket for accommodating such an external card as a SIM (subscriber identity module), a UIM (user identity module), a memory card for information storage and the like.

The power supply unit 190 for supplying power to the mobile terminal is provided to the second rear case 100B-2.

In this case, the power supply unit 190 can be detachably provided as a rechargeable battery to the second rear case 100B-2.

Figure 3:
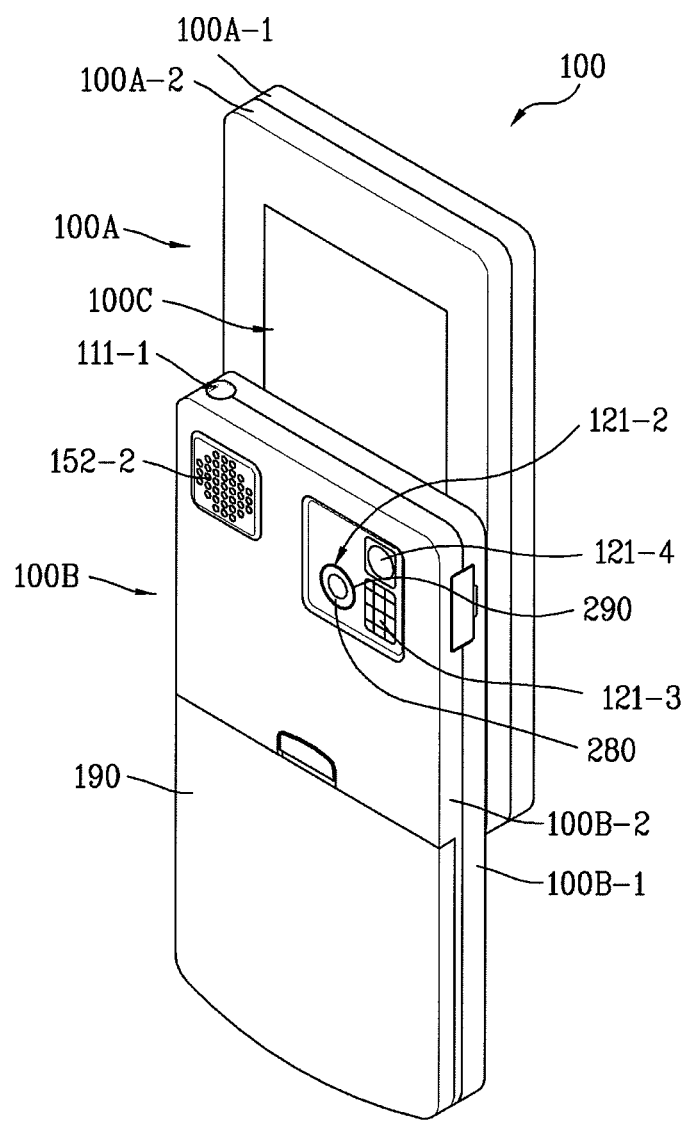
FIG. 3 is a perspective diagram for a backside configuration of a mobile terminal according to an embodiment of the present invention.

FIG. 3 is a perspective diagram for a backside configuration of a mobile terminal according to an embodiment of the present invention.

Referring to FIG. 3, a second camera module 121-2 can be additionally provided to a backside of the second rear case 100B-2 of the second body 100B. The second camera module 121-2 has a photographing direction substantially opposite to that of the first camera module 121-1 shown in FIG. 1 and can have pixels different from those of the first camera module 121-1 shown in FIG. 1.

For instance, the first camera module 121-1 has low pixels enough for taking a picture of user's face and then transmitting the taken picture to a correspondent party in the course of a video call or the like. On the contrary, the second camera module 121-2 takes a picture of a subject but does not transmit the taken picture in general. Therefore, the second camera module 121-1 preferably has high pixels.

In the vicinity of the second camera module 121-2, a flash 121-3 and a mirror 121-4 can be additionally arranged. In case of taking a picture of a subject using the second camera module 121-2, the flash 121-3 shines light toward the subject. In case that a user attempts to take a picture of herself/himself using the second camera module 121-2 (i.e., self-photographing), the mirror 121-4 enables user's face to be reflected thereon.

A second audio output module 152-2 can be additionally provided to the second rear case 100B-2.

The second audio output module 152-2 can implement a stereo function together with the first audio output module 152-1 shown in FIG. 2 and is usable for a call in speakerphone mode.

A broadcast signal receiving antenna 111-1 can be provided to one side of the second rear case 100B-2 as well as an antenna for communication and the like. In this case, the broadcast signal receiving antenna 111-1 can be provided retractable from the second body 100B.

One portion of a slide module 100C configured to enable the first and second bodies 100A and 100B to be slidably assembled together can be provided to the first rear case 100A-2 of the first body 100A.

The other portion of the slide module 100C is provided to the second front case 100B-1 of the second body 100B, thereby avoiding being externally exposed as shown in the present drawing.

In the above description so far, the second camera module 121-2 and the like are provided to the second body 100B, by which the present invention is non-limited.

For instance, at least one of the components 111-1, 121-2, 121-3, 121-4 and 152-2 provided to the second rear case 100B-2 like the second camera module 121-2 can be provided to the fist body 100A, and more particularly, to the first rear case 100A-2. If so, it is advantageous in that the component(s) provided to the first rear case 100A-2 in the closed configuration can be protected by the second body 100B. Moreover, even if the second camera module 121-2 is not separately provided, the first camera module 121-1 is configured rotatable so as to cover a photographing direction of the second camera module 121-2.

In the following description, explained is a case that a protective cover for protecting a lens of a camera module and the like is provided to the camera module and is then installed at a mobile terminal.

Figure 4:
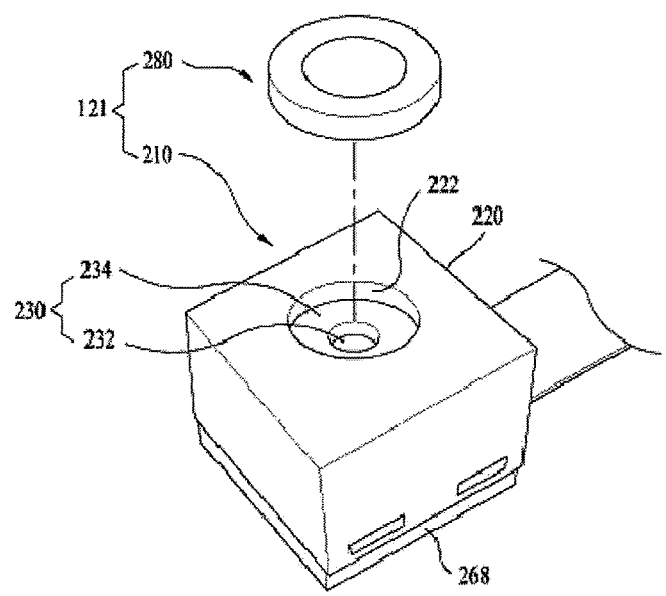
FIG. 4 is an exploded perspective diagram of a camera module configuring an embodiment of the present invention.
Figure 5:
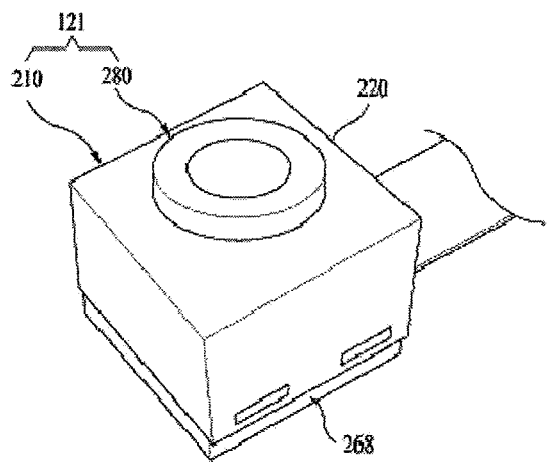
FIG. 5 is a perspective diagram for a configuration of a module body and a protective cover assembled together.

FIG. 4 is an exploded perspective diagram of a camera module configuring an embodiment of the present invention, and FIG. 5 is a perspective diagram for a configuration of a module body and a protective cover assembled together.

Referring to FIG. 4 and FIG. 5, a camera module 121 stores an image frame of a still or moving picture obtained by an image sensor in photographing mode in a digital storage medium.

For instance, the camera module 121 detects an image using an electronic sensor without a film and then stores the image information in a digital image file format such as JPEG, TIFF, raw format, GIF and the like or a digital video file format such as MPEG, DV, MJPEG and the like.

The camera module 121 can be provided to the first body 100A or the second body 100B. In the following description, the first front case 100A-1, the first rear case 100A-2, the second front case 100B-1, the second rear case 100B-2 and the like are generally called a case 100AB.

The case 100AB forms an exterior of the bodies 100A and 100B. And, a penetrating hole 290 is formed top-to-bottom in the case 100AB to form an opening [cf. FIG. 8]. Structures of the case 100AB and the penetrating hole 290 will be described later.

And, the camera module 121 includes a module body 210 configured to form an optical image and convert it to an electric signal and a protective cover 280 formed of a light-transmitting material to isolate an inner space of the module body 210 from an external environment.

Figure 6:
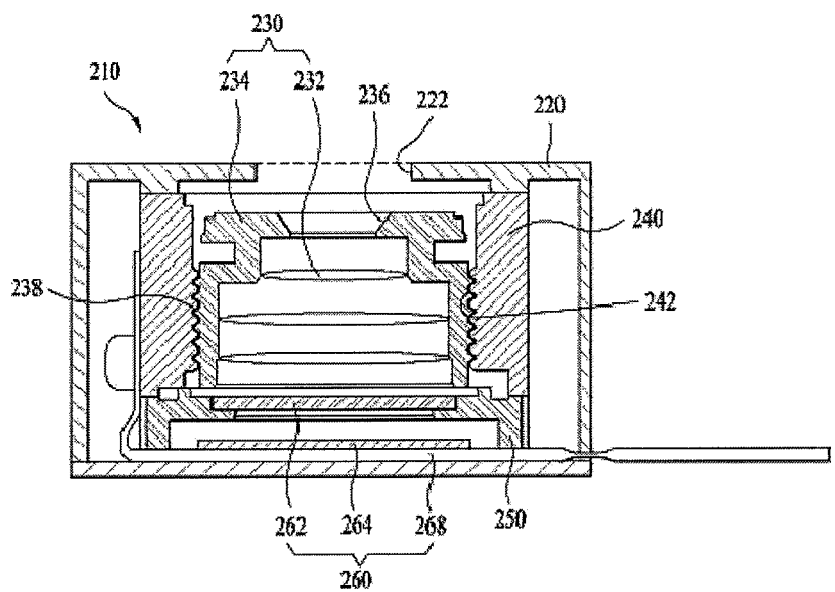
FIG. 6 is a cross-sectional diagram of a module body configuring an embodiment of the present invention.
Figure 7:
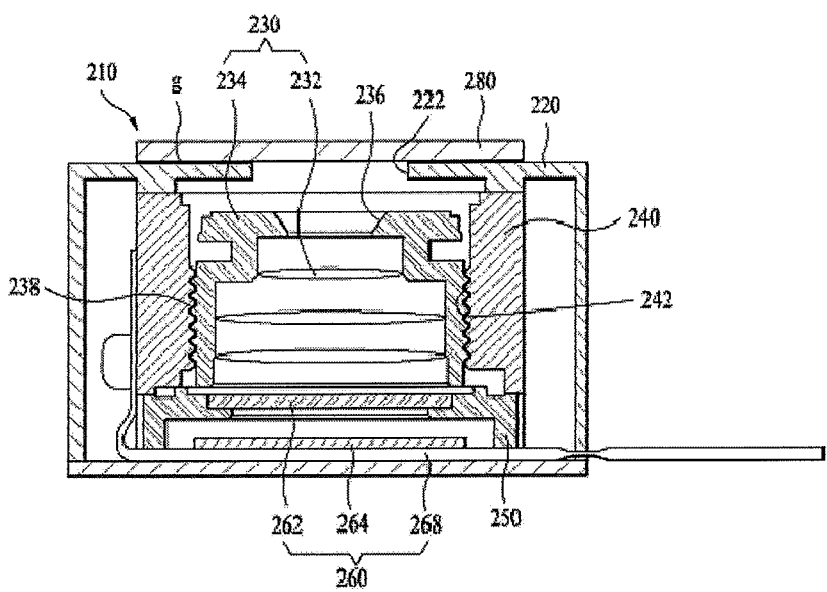
FIG. 7 is a cross-sectional diagram for an assembled configuration of a protective cover according to an embodiment of the present invention.

FIG. 6 is a cross-sectional diagram of a module body configuring an embodiment of the present invention, and FIG. 7 is a cross-sectional diagram for an assembled configuration of a protective cover according to an embodiment of the present invention.

Referring to FIG. 6 and FIG. 7, a module body 210 is provided within a case 100AB.

The module body 210 includes at least one lens 232 provided toward a penetrating hole 290 to oppose an open incident hole 236 or an opening 222 and an image sensor 264 configured to form an optical image of a subject delivered via the incident hole 236 or the opening 222 and convert the formed image to an electric signal.

In particular, the module body 210 includes a lens unit 230 receiving an optical image of a subject, a lens driving unit 240 moving the lens unit 230, a holder configured to hold the lens driving unit 240, and a sensor unit 260 forming an optical image and converting it to an electric signal.

An exterior and frame of the module body 210 is formed by a housing 220. The housing 220 can be formed in a hexahedral shape to have a predetermined volume. According to a design condition, the housing 220 can have a shape of a column, a polygonal pillar, a polyhedron or the like. The opening 222 is provided to one side of the housing 220 to enable light to enter the housing 220.

The lens unit 230 is provided within the housing 220 to receive an optical image of a subject. The lens unit 230 forms an optical image by condensing or diverging light. And, the lens unit 230 can include a combination of convex and concave lenses.

Moreover, the lens unit 230 can include at least one lens 232 and a barrel 234 having the at least one lens 232 loaded in its inner body space.

The incident hole 236 is provided to an outer circumference of a topside of the barrel 234 to enable light to pass therethrough. Alternatively, according to a design condition, the incident hole can be provided to a center of a topside of a cap (not shown in the drawings) provided to the outer circumference of the tip of the barrel 234. And, a screw part 238 can be provided to an outer circumference of the barrel 234 to be supported by the lens driving unit 242.

The lens driving unit 240 shifts the barrel 234 having the lens unit 230 loaded therein to an optical axis and then adjusts the focus on a subject. Meanwhile, a screw part 242 is provided to an inner surface of the lens driving unit 240 to be screwed with the former screw part 238 provided to the outer circumference of the barrel 234.

An inner space provided with the holder 250. The sensor unit 260 converts a subject related light incident via the lens 232 to image data of electric signal and then transfers the image data to a display module 151 and the like.

The sensor unit 260 can include an infrared cut-off filter 262, an image sensor 264 and a circuit board 268.

The infrared cut-off filter 262 filters the subject related light having passed through the lens 232. Unlike human eyes, the image sensor 264 (i.e., an image pickup device) enables detection of near infrared ray wavelength and infrared region wavelength. In case of image pickup, the color tone has a tendency toward red. Therefore, the infrared cut-off filter 262 is provided to cut off the corresponding wavelength regions.

The infrared cut-off filter 262 is provided between the lens unit 230 and the image sensor 264. If the image sensor 264 is supported with infrared cut-off functionality, it is able to omit the infrared cut-off filter 262.

The image sensor 264 forms an optical image of a subject, which is delivered via the lens unit 230, and then converts the optical image to an electric signal.

The image sensor 264 includes a pixel area (not shown in the drawings) constructed with a multitude of pixels and a multitude of electrodes (not shown in the drawings) as input/output terminals of the pixel area. In this case, a multitude of the electrodes are electrically connected to electrodes of the circuit board 268 using a wire bonding equipment, respectively.

The image sensor 264 indicates an imaging device component that generates an image from a mobile phone camera, a digital still camera (DSC) or the like. According to a fabricating processes and applications, the image sensors can be classified into CCD (charge coupled device) image sensor, a CMOS (complementary metal oxide semiconductor) image sensor and the like.

The circuit board 268 is generally called a printed circuit board. The circuit board 268 is constructed with a prescribed electrical pattern and a plurality of electrodes. And, such parts as resistors, diodes and the like are loaded on the circuit board 268. Moreover, the circuit board 268 is electrically connected to the image sensor 264 to play a role in digitally processing a video signal outputted from the image sensor 264.

The circuit board 268 includes a hard substrate of which material is hard. Alternatively, the circuit board 268 can include a flexible printed circuit board (FPCB) that is thin and flexible in a manner of attaching a copper film onto an insulating film. Meanwhile, the image data converted by the image sensor 264 is transferred to the display module 151 via the circuit board 268.

Yet, in the above-configured module body 10, since the lens unit 230 is externally exposed via the opening 222, it may happen that external particles may be introduced into the module body 210.

Therefore, a protective cover 280 for protecting the lens unit 230 and the like is provided to the module body 210. The protective cover 280 is attached to one face of the module body 210 opposing the incident hole 236 or the opening 222. The protective cover 280 is formed of a transparent material capable of transmitting light therethrough. And, the protective cover 280 is exposed outside the case 100AB via the penetrating hole 290.

An adhesive agent (g) is coated between the protective cover 280 and the module body 210 so that an inner space of the module body 210 can be isolated from outside. In particular, the adhesive agent (g) is coated on edges of the protective cover 280 so as to avoid generating a gap between the protective cover 280 and the module body 210. Namely, the module body 210 and the protective cover 280 are formed in one body to construct the camera module 121.

Figure 8:
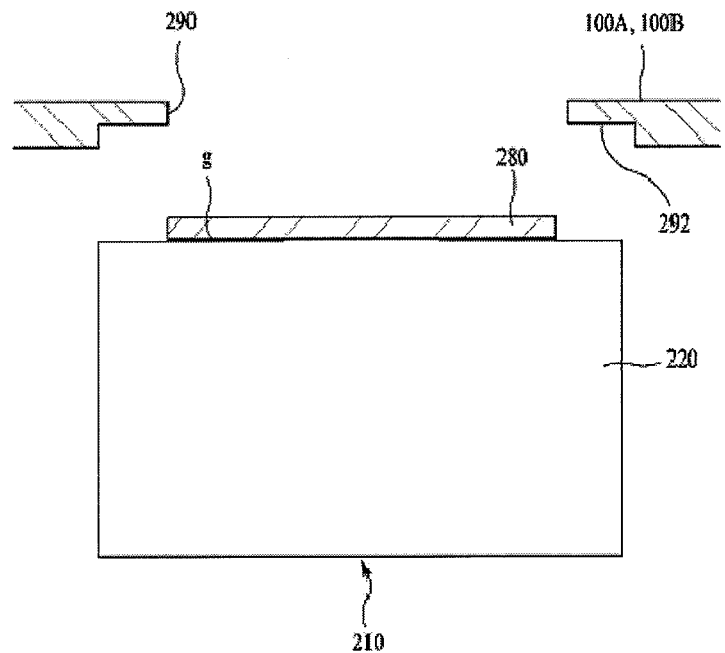
FIG. 8 is a diagram for a case and a camera module, which are detached from each other, according to one embodiment of the present invention.
Figure 9:
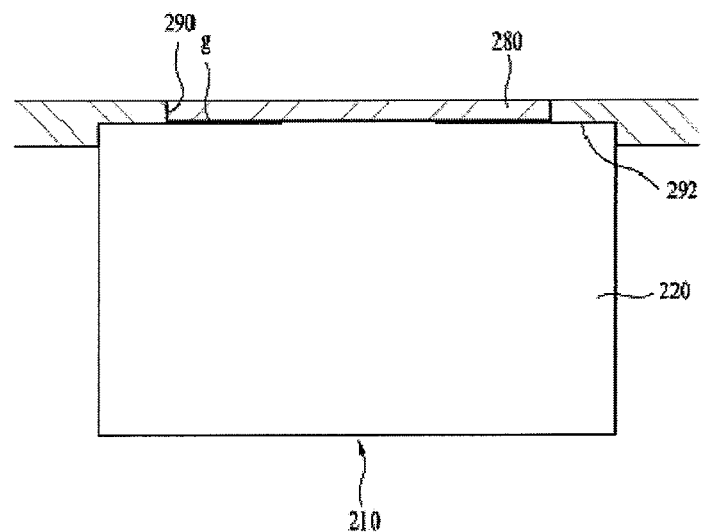
FIG. 9 is a diagram for a case and a camera module, which are assembled together, according to one embodiment of the present invention.

FIG. 8 is a diagram for a case and a camera module, which are detached from each other, according to one embodiment of the present invention, and FIG. 9 is a diagram for a case and a camera module, which are assembled together, according to one embodiment of the present invention.

Referring to FIG. 8 and FIG. 9, as mentioned in the foregoing description, a penetrating hole 290 s formed in a case 100AB. And, a protective cover 280 off a camera module 121 is located at the penetrating hole 290. And, one face of a module body 210 including an incident hole 236 and an opening 222 is supported by an inner surface of the case 100AB.

A loading portion 292 is provided to the case 100AB. In this case, the loading portion 292 is recessed along the edge of the penetrating hole 290. One face of the module body 210 is configured to closely adhere to the loading portion 292. In particular, the loading portion 292 recessed along the edge of the penetrating hole 290 is provided to the inner surface of the case 100AB to correspond to the module body 210. And, one face of the module body 210 having the incident hole 236 formed therein closely adheres to the loading portion 292. The loading portion 292 is configured to correspond to the module body 210. When the camera module 121 is installed at the case 100AB, the loading portion 292 plays a role in guiding an installation position of the camera module 121 and also preventing fluctuation of the camera module 121 by stably supporting the fixed camera module 121.

The penetrating hole 290 is configured to correspond to the protective cover 280. And, an outer surface of the protective cover 280 and an outer surface of the case 100AB are located in the same plane. For this, a height of the protective cover 280 projected from one face of the module body 210 is preferably set equal to a thickness of the case 100AB provided with the loading portion 292.

Preferably, an inner circumference of the case 100AB provided with the penetrating hole 290 and an outer circumference of the protective cover 280 are configured to closely adhere to each other. For this, an outer diameter of the protective cover 280 is configured greater than an inner diameter of the penetrating hole 290. And, the protective cover 280 is fitted into the penetrating hole 290 by shrink-fit. Moreover, the protective cover 280 can be formed of tempered glass strong against external shock or abrupt temperature change in a manner of thermally treating glass.

Thus, in case that the protective cover 280 is loaded not in the case but in the module body 210 to configure the camera module 121, the protective cover 280 can protect the lens unit 230 provided to the module body 210 before the camera module 121 is loaded in the case 100AB.

Light can pass through the protective cover 280 configured to isolate the inside of the camera module from the outside, whereby external particles can be prevented from being introduced into the camera module 121.

The camera module 121 is guided to the installation position by the loading portion 292 without separate configuration provided between the case 100AB and the camera module 121. And, the protective cover 280 of the camera module 121 is externally exposed in direct without a separate cover provided to the case 100AB. Therefore, accumulation of numerical value tolerance is barely generated by the component assembly. And, an assembly process is simplified.

The protective cover 280 of the camera module 121 is directly exposed to a surface of the case 100AB. And, the module body 210 is supported by an inner surface of the case 100AB. Therefore, a separate pad for dust prevention is not necessary.

In particular, in case that the protective cover 280 for protecting the lens 232 of the module body 210 is provided to the case 100AB, a dust prevention pad or the like is provided between the protective cover 280 and the module body 210 or a structure for fixing an installation position of the module body 210 should be added.

Yet, in case that the protective cover 280 directly attached to the module body 210 is exposed outside the case 100AB, it is able to prevent external particles from being introduced into the module body 210. Therefore, the dust prevention pad is unnecessary. As the protective cover 280 is inserted in the penetrating hole 290 of the case 100AB, an installation position of the camera module 121 is guided and the module body 210 is directly supported by the loading portion 292 of the case 100AB. Therefore, a separate fixing structure is unnecessary.

If the protective cover 280 is directly attached to the module body 210, it is unnecessary to add the dust prevention pad and the camera module fixing structure. Therefore, it is advantageous in maximizing space utilization of the camera module 121 and reducing a thickness of the mobile terminal relatively.

A mobile terminal according to another embodiment of the present invention is explained in detail with reference to the accompanying drawings as follows.

According to another embodiment of the present invention, a structure of a case and an assembled state of a camera module are different from those of the former embodiment of the present invention only. And, the same parts shown in FIGS. 1 to 9 will not be explained in the following description for clarity.

Figure 10:
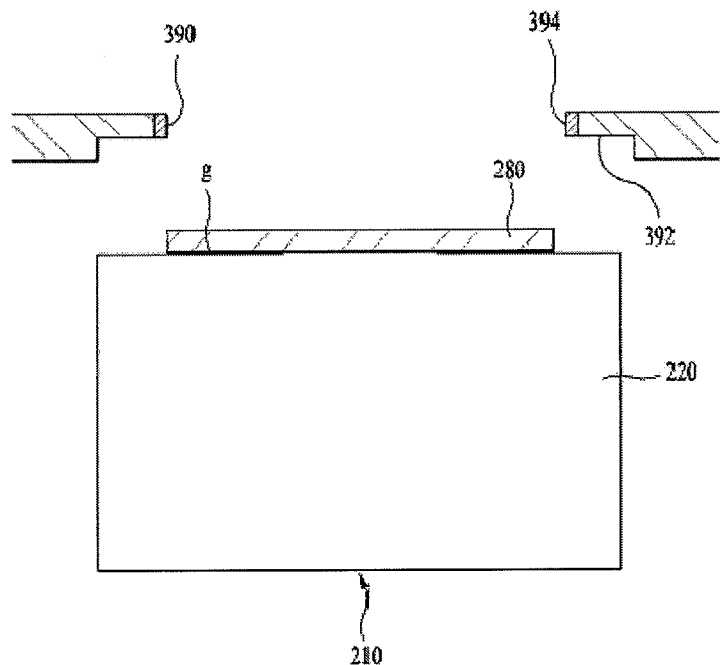
FIG. 10 is a diagram for a case and a camera module, which are detached from each other, according to another embodiment of the present invention.
Figure 11:
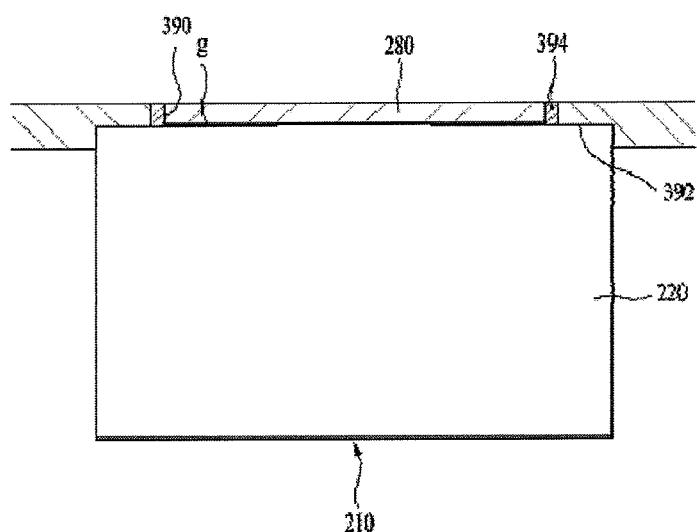
FIG. 11 is a diagram for a case and a camera module, which are assembled together, according to another embodiment of the present invention.

FIG. 10 is a diagram for a case and a camera module, which are detached from each other, according to another embodiment of the present invention, and FIG. 11 is a diagram for a case and a camera module, which are assembled together, according to another embodiment of the present invention.

Referring to FIG. 10 and FIG. 11, a penetrating hole 390, via which a protective cover 280 of a camera module 121 is exposed, is provided to a case 100AB to correspond to the protective cover 280. And, a loading portion 392 is provided to the case 100AB in a manner of being recessed along an edge of the penetrating hole 390.

A ring type sealing member 394, which is configured to enclose an outer circumference of the protective cover 280 to support, is provided to an inner circumference of the case 100AB provided with the penetrating hole 390. In this case, the sealing member 394 is formed of a elastically-transformable material and can be provided to be forcibly attached to the outer circumference of the protective cover 280. The sealing member 394 plays a role in removing a gap between the penetrating hole 390 and the protective cover 280 due to numerical value tolerance and the like.

According to a design condition, the sealing member 394 is formed of such material as plastics, rubber and the like and can be provided to the inner circumference of the case 100AB having the penetrating hole 390. Alternatively, while the protective cover 280 is located in the penetrating hole 390, the sealing member 394 can be formed in a manner of filling the penetrating hole 390 with silicon or the like.

Thus, if the sealing member 394 is provided between the case 100AB and the protective cover 280, it is able to prevent external particles from being introduced between the case 100AB and the protective cover 280.

For this, an outer diameter of the protective cover 280 is configured greater than an inner diameter of the penetrating hole 390. And, the protective cover 280 is fitted into the penetrating hole 390 by shrink-fit. Moreover, the protective cover 280 can be formed of tempered glass that is strong against external shock or abrupt temperature change in a manner of thermally treating glass.

A mobile terminal according to a further embodiment of the present invention is explained in detail with reference to the accompanying drawings as follows.

According to a further embodiment of the present invention, a structure of a case and an assembled state of a camera module are different from those of the former embodiment of the present invention only. And, the same parts shown in FIGS. 1 to 9 will not be explained in the following description for clarity.

Figure 12:
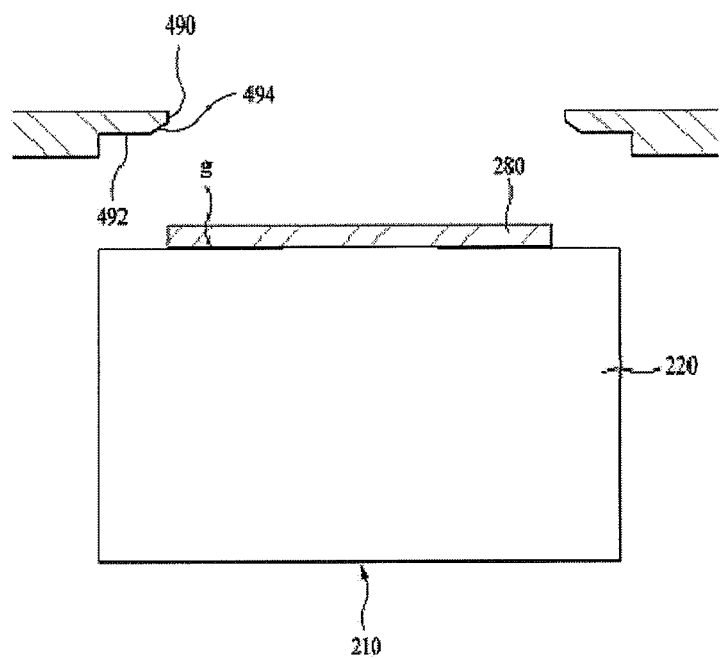
FIG. 12 is a diagram for a case and a camera module, which are detached from each other, according to a further embodiment of the present invention.
Figure 13:
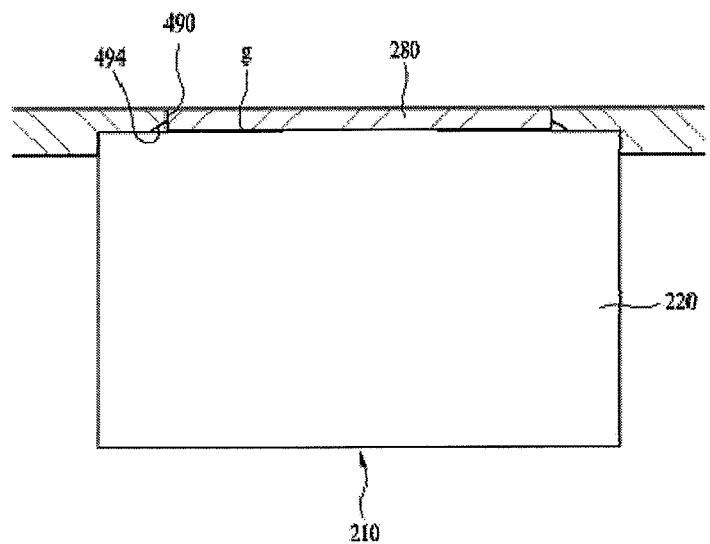
FIG. 13 is a diagram for a case and a camera module, which are assembled together, according to a further embodiment of the present invention.

FIG. 12 is a diagram for a case and a camera module, which are detached from each other, according to a further embodiment of the present invention, and FIG. 13 is a diagram for a case and a camera module, which are assembled together, according to a further embodiment of the present invention.

Referring to FIG. 12 and FIG. 13, a penetrating hole 490, via which a protective cover 280 of a camera module 121 is exposed, is provided to a case 100AB to correspond to the protective cover 280. And, a loading portion 492 is provided to an inner surface of the case 100AB in a manner of being recessed along an edge of the penetrating hole 490 to correspond to a module body 210. And, one face of the module body 210 is supported in a manner of adhering closely to the loading portion 492.

A guide portion 494 is provided to an inner circumference of the case 100AB having the penetrating hole 490 along an edge of the penetrating hole 490 in a manner of inclining toward an assembled direction of the protective cover 280. The guide portion 494 is formed to incline along the edge of the penetrating hole 490 between the inner circumference of the case 100AB having the penetrating hole 490 and the loading portion 492.

The guide portion 494 plays a role in guiding a moving path of the protective cover 280 while the protective cover 280 is being fitted into the penetrating hole 490 of the case 100AB. In particular, when the protective cover 280 approaches the case 100AB on deviating aside from the penetrating hole 490, the guide portion 494 guides a fitting direction of the protective cover 280 to correct an installation position of the camera module 121 at the case 100AB.

Meanwhile, at least one of the loading portion 292, the sealing member 394, the guide portion 494 and the like can be included in the configurations applied to the case 100AB according to design conditions. Alternatively, the whole of the loading portion 292, the sealing member 394, the guide portion 494 and the like can be simultaneously included in the configurations applied to the case 100AB.

Accordingly, the present invention provides the following effects and/or advantages.

First of all, according to the present invention, since a camera module is configured in a manner that a protective cover is provided not to a case but to a module body, it is advantageous in protecting a lens unit provided to the module body before installing the camera module at the case.

Secondly, according to the present invention, while light passes through a protective cover, a protective cover physically isolates an inside of a camera module from an outside to prevent external particles from being introduced into the camera module. Therefore, it is advantageous in enhancing durability of the camera module.

Thirdly, according to the present invention, a loading portion is provided to a case to guide an installation position of a camera module. A separate cover is not added to the case. And, a protective cover of a camera module is directly exposed to outside. Therefore, accumulation of numerical value tolerance is barely generated and an assembly process is simplified.

Finally, according to the present invention, a protective cover of a camera module is directly exposed to a surface of a case and a module body is supported by an inner surface of the case. Therefore, a separate pad for preventing dust and particles, a camera module fixing structure and the like are unnecessary. As the separate pad, the camera module fixing structure and the like are unnecessary, the present invention optimizes a space of installation of the camera module, thereby relatively reducing a thickness of a mobile terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
    a case having a penetrating hole;
    a camera module located in the case, the camera module including:
        an incident hole open towards the penetrating hole;
        at least one lens facing the incident hole; and
        an image sensor configured to form an optical image of a subject delivered via the incident hole to convert the optical image to an electric signal; and
    a protective cover attached to a surface of the camera module having the incident hole, the protective cover being formed of a transparent material through which light passes, and the protective cover being exposed through the case via the penetrating hole of the case,
    wherein the case includes a recessed loading portion provided along an edge of the penetrating hole, and a portion of said surface of the camera module contacts the loading portion, and
    wherein an inner surface of the case at the penetrating hole includes a guide portion inclined at an angle with respect to the penetrating hole along an edge of the penetrating hole.

2. The mobile terminal of claim 1, further comprising an adhesive between the protective cover and said surface of the camera module.

3. The mobile terminal of claim 2, wherein said surface of the camera module is supported by an inner surface of the case.

4. The mobile terminal of claim 1, wherein the penetrating hole is configured to receive the protective cover and wherein an outer surface of the protective cover and an outer surface of the case are located in the same plane.

5. The mobile terminal of claim 4, wherein a height of the protective cover projected from said surface of the camera module is equal to a thickness of the case at the loading portion.

6. The mobile terminal of claim 3, wherein the penetrating hole is sized to conform to an outer circumference of the protective cover.

7. The mobile terminal of claim 6, wherein an outer diameter of the protective cover is set greater than an inner diameter of the penetrating hole and wherein the protective cover is forcibly fitted into the penetrating hole by shrink-fitting.

8. The mobile terminal of claim 1, wherein a sealing member is provided at an inner circumference of the penetrating hole to enclose and support an outer circumference of the protective cover.

9. The mobile terminal of claim 8, wherein the sealing member is formed of a compressible material.

10. The mobile terminal of claim 1, wherein the guide portion is arranged between the penetrating hole and the loading portion.

11. The mobile terminal of claim 1, wherein the protective cover is formed of tempered glass.

12. The mobile terminal of claim 1, wherein the camera module includes a module body, the incident hole is provided in one surface of the module body, and the at least one lens and image sensor are located in the module body.

13. A mobile terminal comprising:
    a case having a penetrating hole;
    a camera module provided within the case, the camera module comprising:
        at least one lens facing the penetrating hole; and
        an image sensor configured to form an optical image of a subject delivered via the at least one lens to convert the optical image to an electric signal; and
    a protective cover inserted in the penetrating hole to protect the at least one lens,
    wherein the case includes a recessed loading portion provided along an edge of the penetrating hole, and a portion of a surface of the camera module facing the protective cover contacts the loading portion, and
    wherein an inner surface of the case at the penetrating hole includes a guide portion inclined at an angle with respect to the penetrating hole along an edge of the penetrating hole.

14. The mobile terminal of claim 13, wherein the camera module includes an incident hole provided at said surface of the camera module and the protective cover is affixed to said surface of the camera module.

15. The mobile terminal of claim 14, wherein said surface of the camera module is supported by an inner surface of the case.

16. The mobile terminal of claim 15, wherein an outer surface of the protective cover and an outer surface of the case are located in the same plane.

* * * * *